(12) United States Patent
Jouper

(10) Patent No.: US 9,178,358 B2
(45) Date of Patent: Nov. 3, 2015

(54) ENHANCED LOAD MANAGEMENT AND DISTRIBUTION SYSTEM

(71) Applicant: Astronics Advanced Electronic Systems Corp., Kirkland, WA (US)

(72) Inventor: Jeffrey A. Jouper, Newcastle, WA (US)

(73) Assignee: Astronics Advanced Electronic Systems Corp., Kirkland, WA (US)

( * ) Notice: Subject to any disclaimer, the term of this patent is extended or adjusted under 35 U.S.C. 154(b) by 42 days.

(21) Appl. No.: 14/161,973

(22) Filed: Jan. 23, 2014

(65) Prior Publication Data

US 2014/0136011 A1   May 15, 2014

Related U.S. Application Data

(63) Continuation of application No. 12/958,534, filed on Dec. 2, 2010, now Pat. No. 8,692,409.

(51) Int. Cl.
*H02J 4/00* (2006.01)
*H02J 3/14* (2006.01)

(52) U.S. Cl.
CPC ... *H02J 4/00* (2013.01); *H02J 3/14* (2013.01); *Y02B 70/3225* (2013.01); *Y04S 20/222* (2013.01); *Y10T 307/25* (2015.04); *Y10T 307/406* (2015.04); *Y10T 307/43* (2015.04); *Y10T 307/438* (2015.04); *Y10T 307/461* (2015.04); *Y10T 307/477* (2015.04)

(58) Field of Classification Search
CPC ............. H02J 3/14; H02J 4/00; Y04S 20/222; Y02B 70/3225
USPC .......................................................... 307/31
See application file for complete search history.

(56) References Cited

U.S. PATENT DOCUMENTS

RE39,036 E * 3/2006 Castleman ..................... 323/283
7,043,543 B2 * 5/2006 Ewing et al. ................... 709/223

* cited by examiner

*Primary Examiner* — Rexford Barnie
*Assistant Examiner* — Toan Vu
(74) *Attorney, Agent, or Firm* — Wiggin and Dana LLP; Gregory S. Rosenblatt; Jonathan D. Hall

(57) ABSTRACT

A system for managing distribution of electrical power includes a power management circuit, power control units, a first keyline and a second keyline. The power management circuit includes a device configured to measure power consumed by an electrical load, and a comparator comparing the measured power with a power limit. Each power control unit includes an outlet for delivering power to a load; a timing control circuit coupled to each outlet and configured to deliver an enabling signal to each outlet individually with a time delay; a signal input; and a signal output. The first keyline connects the power management circuit with the signal input of one power control unit; the second keyline connects the signal output of that power control unit with the signal input of another power control unit. Each power control unit is configured to propagate a signal to another power control signal via the second keyline.

10 Claims, 9 Drawing Sheets

ENHANCED LOAD MANAGEMENT AND DISTRIBUTION SYSTEM

CROSS REFERENCE TO RELATED APPLICATIONS

The present application is a continuation application of U.S. patent application Ser. No. 12/958,534, entitled "Enhanced Load Management and Distribution System" and filed on Dec. 2, 2010, the entire contents of which is incorporated herein by reference.

FIELD OF THE DISCLOSURE

This disclosure relates to systems for supplying power to one or more electrical loads. More specifically, this invention relates to managing the supply of power to one or more loads in a limited power environment.

BACKGROUND OF THE DISCLOSURE

Transportation systems, such as an aircraft, a ship, or a train, typically provide only a limited supply of power. This power supply serves not only those systems that are essential, but non-essential equipment as well. Aboard an aircraft, for example, the propulsion system provides a finite amount of power to operate both essential equipment, such as life-support, communication, and flight control, and non-essential equipment, such as coffee makers, in-flight commercial phones, in-seat entertainment centers, and a variety of devices operated by passengers.

Because power is limited, non-essential equipment must compete with other non-essential equipment for power. If the load from non-essential equipment exceeds the allowable load, some essential equipment may be deprived of power. Furthermore, the power supply itself may be damaged from the additional loads.

Several systems and methods have been developed to monitor and adjust the power requirements of the load, determining which equipment to turn off and/or causing the equipment to enter a power saving mode ("load-shedding").

U.S. Pat. Nos. 5,754,445 and 6,046,513, the disclosures of which are incorporated by reference herein in their entirety, describe a power management system in which the load at consumers' outlets (where music players, computing devices, etc. may be plugged in) is continually monitored, and certain not-in-use outlets are disabled when the system enters a power-management mode. A power management circuit is connected to various decentralized power control units (also referred to as power supply units or power converters) each supplying power to one or more outlets. A signal on a line connected to the power control units (hereafter called an ENABLE keyline) indicates whether the system is in an enabled mode or in a power-managed mode. The state of this signal enables or disables outlets that are not in use. In these systems, a consumer device that is in use is not turned off when entering power-management mode.

A system as described in the above-referenced patents is shown schematically in FIG. 1. Power management circuit 1 monitors the power consumed by the system 3 and compares this level, using a limit comparator 5, to the power load limit 6. The ENABLE signal is transmitted to the power control units 2 on ENABLE keyline 7; a SET condition signifies that system power is available at the various outlets. When the limit comparator 5 determines that the total power sensed is below the limit, the ENABLE keyline 7 is SET. When a consumer connects a device to an outlet 11, a request 9 for power is initiated to the control unit. If the ENABLE keyline is SET when the request for power is initiated, the output control 8 enables power to the device plugged into the outlet 11.

If the limit comparator 5 shows that the power limit has been reached, the ENABLE keyline 7 is reset to signify the additional power is not available. Accordingly, unused power outlets are disabled until the total system power consumption falls below a second threshold (as determined by limit comparator 5), at which time those outlets are re-enabled for use by the consumer. Should a consumer have plugged in a device while the system was in the power management mode (so that the device was plugged into a disabled outlet), control latch 10 requires that the user unplug the device and plug it in again to initiate a request for power. In addition, an indicator is typically provided on the outlet to show that power is available. If the indicator is extinguished, the indicator is locked off, so that there will not be an indication that power has been restored until the device is unplugged. This is inconvenient for the consumer, since it is difficult for the consumer to know whether power is available or has been restored in these situations.

Systems have been devised to avoid this consumer inconvenience by automatically connecting power to devices plugged in during a power management phase. In one such system, each power control unit is provided with timers, with a timer connected to each outlet. The timers can impose a delay between activation of the individual outlets in the power control unit. If the ENABLE keyline is SET when a request for power is initiated, the output control enables power to the consumer device plugged into the outlet; no delay is initiated as long as power is available when the device is plugged in. Should the consumer have plugged in the device while the system is in the power management phase (that is, the ENABLE keyline signifies that no additional power is available and unused outlets are disabled), the timer limits when the outlet may be reconnected. The timer starts a delay period during which the limit comparator senses the total power consumption. When the delay period expires, if additional power is still available the outlet is automatically activated. The next outlet in the power control unit is likewise activated with a delay if a device was plugged in during the power management phase; this continues until the final outlet in the unit is activated.

More recently, a system has been disclosed having specifically random timer action for enabling of individual outlets connected to a decentralized power supply unit. This system is shown schematically in FIG. 2. Power management circuit 42 monitors the power consumed by the system 44 and compares this power level to the power limit 43 using limit comparator 41. When the limit comparator 41 determines that the total power sensed is below the limit, the ENABLE keyline 33 is SET. As a consumer connects a device to outlet 39, a request for power 38 is initiated to the power supply unit 45. If the ENABLE keyline is SET when the request for power is initiated, output control 40 enables power to the device plugged into outlet 39. No delay is initiated as long as power is available when the device is plugged in.

If the limit comparator 41 determines that the power limit has been reached, the ENABLE keyline 33 is reset to signify the additional power is not available. Unused power outlets 46, 47 accordingly are disabled until the total system power consumption falls below a second threshold as determined by limit comparator 41 and re-enables outlets 46, 47 for use by the consumer.

Should a consumer have plugged in while the system is in the power management mode (that is, ENABLE keyline 33 signifies that no additional power is available and unused outlets are disabled), and subsequently the power consumption 44 falls below the threshold determined by limit comparator 41, then the ENABLE keyline is SET and timers 35, 36, 37 determine when each respective outlet will be reconnected. In this system, the timers are initiated at the same time, but cause delays of random lengths at the respective outlets. As each random delay time expires, the associated outlet is enabled if the ENABLE keyline 33 remains SET.

All of the decentralized power supply units 45, 50, etc. receive the ENABLE keyline signal at the same time. All of the random timers in each power supply unit thus start at the same time. Since the delays are of random lengths, the risk of two loads being activated simultaneously is reduced. However, in a system where multiple power supply units are attached, a number of outlets with loads still may be activated within close proximity in time. This may not allow enough time for the power management circuit 42 to measure the consumed power and control the ENABLE keyline to limit the number of outlets activated to avoid a system overload.

In the timed automatic-connect system and random-timer system described above, there may be loss of control of the power load during the re-connect sequence so that the system maximum is inadvertently exceeded. For example, laptop computers typically require several seconds before the charging circuit reaches full current. In addition to the device delay time, there is a period of time required for the power management circuit to measure the power consumed, and for the limit comparator to determine if additional power is available and set the ENABLE keyline appropriately. If the system has several power control units, a number of outlets with loads may be activated simultaneously or nearly simultaneously, and thus cause overload of the power system.

The systems described just above avoid inconvenience to the consumer, but allow a potential for loss of system control and overload of the power system. There remains a need for a load management system for limited power environments that can re-connect devices while maintaining control of the overall load.

SUMMARY OF THE DISCLOSURE

In accordance with an aspect of the disclosure, a system for managing distribution of electrical power includes a power management circuit, a plurality of power control units, a first keyline and a second keyline. The power management circuit includes a device configured to measure power consumed by an electrical load, and a comparator configured to compare the measured power with a power limit. Each of the power control units includes at least one outlet for delivering power to a load; a timing control circuit coupled to each outlet and configured to deliver an enabling signal to each outlet individually with a time delay; a signal input; and a signal output. The first keyline connects the power management circuit with the signal input of one of the power control units; the second keyline connects the signal output of that power control unit with the signal input of another power control unit. Each power control unit is configured to propagate a signal to another power control signal via the second keyline.

The keylines deliver either a SET or RESET signal, depending on whether the measured power does not exceed the limit or exceeds the limit, respectively.

In accordance with another aspect of the disclosure, a method for managing distribution of electrical power includes measuring power consumed by an electrical load; comparing the measured power with a power limit; delivering one of a SET signal and a RESET signal to a power control unit, in accordance with the measured power not exceeding the power limit and exceeding the power limit respectively; and propagating one of the SET signal and the RESET signal, in accordance with the signal delivered to the power control unit, to another power control unit. The power control unit includes at least one outlet and a timing control circuit. The SET signal causes the timing control circuit to send an enabling signal to the outlet, thereby making power available at the outlet; the RESET signal prevents the timing control circuit from sending an enabling signal to an outlet not connected to a consumer device at initiation of the reset condition. In specific embodiments, the SET/RESET signal is delivered using a first keyline connecting one power control unit to a power management circuit configured to perform the measuring and comparing steps, and the signal is propagated using a second keyline connecting that power control unit to the other power control unit; the first keyline is separate from the second keyline.

In accordance with another aspect of the disclosure, a method for managing distribution of electrical power by a power system (where the system includes a plurality of power control units each having an outlet coupled thereto and a timing control circuit) includes measuring power consumed by an electrical load; comparing the measured power with a power limit to obtain a first comparison result; and, in accordance with the first comparison result indicating the measured power exceeding the power limit, preventing connection of an additional load to the power system. Subsequently, the measured power is compared with the power limit to obtain a second comparison result. In accordance with the second comparison result indicating that the measured power does not exceed the power limit, an enabling signal is delivered to one power control unit, causing the timing control circuit to send a signal to the outlet and thereby permitting connection of additional loads to the power system. The enabling signal is propagated to another power control unit. In specific embodiments, the enabling signal is delivered using a first keyline connecting the power control unit to a power management circuit, and the enabling signal is propagated using a second keyline, separate from the first keyline, connecting the power control unit to another power control unit.

The foregoing has outlined, rather broadly, the preferred features of the present disclosure so that those skilled in the art may better understand the detailed description of the disclosure that follows. Additional features of the disclosure will be described hereinafter that form the subject of the claims of the disclosure. Those skilled in the art should appreciate that they can readily use the disclosed conception and specific embodiment as a basis for designing or modifying other structures for carrying out the same purposes of the present disclosure and that such other structures do not depart from the spirit and scope of the disclosure in its broadest form.

BRIEF DESCRIPTION OF THE DRAWINGS

FIG. 5 is a flowchart schematically illustrating startup of a system according to an embodiment of the disclosure, in which no user devices are plugged in.

FIG. 6 is a flowchart schematically illustrating startup of a system according to an embodiment of the disclosure, in which user devices are plugged in.

DETAILED DESCRIPTION

As described in detail below, embodiments of the disclosure include a power distribution and management system with a strategically controlled re-connect function, including a power measurement device, power controller units, and outlets for delivering power to distributed loads. Operation of the system, in accordance with embodiments of the disclosure, includes systematically connecting loads when power is available, in a controlled manner such that system power consumption can be maintained below a prescribed maximum limit; the system maintains controlled power management without the need for manual intervention.

System Overview

Figure 1:
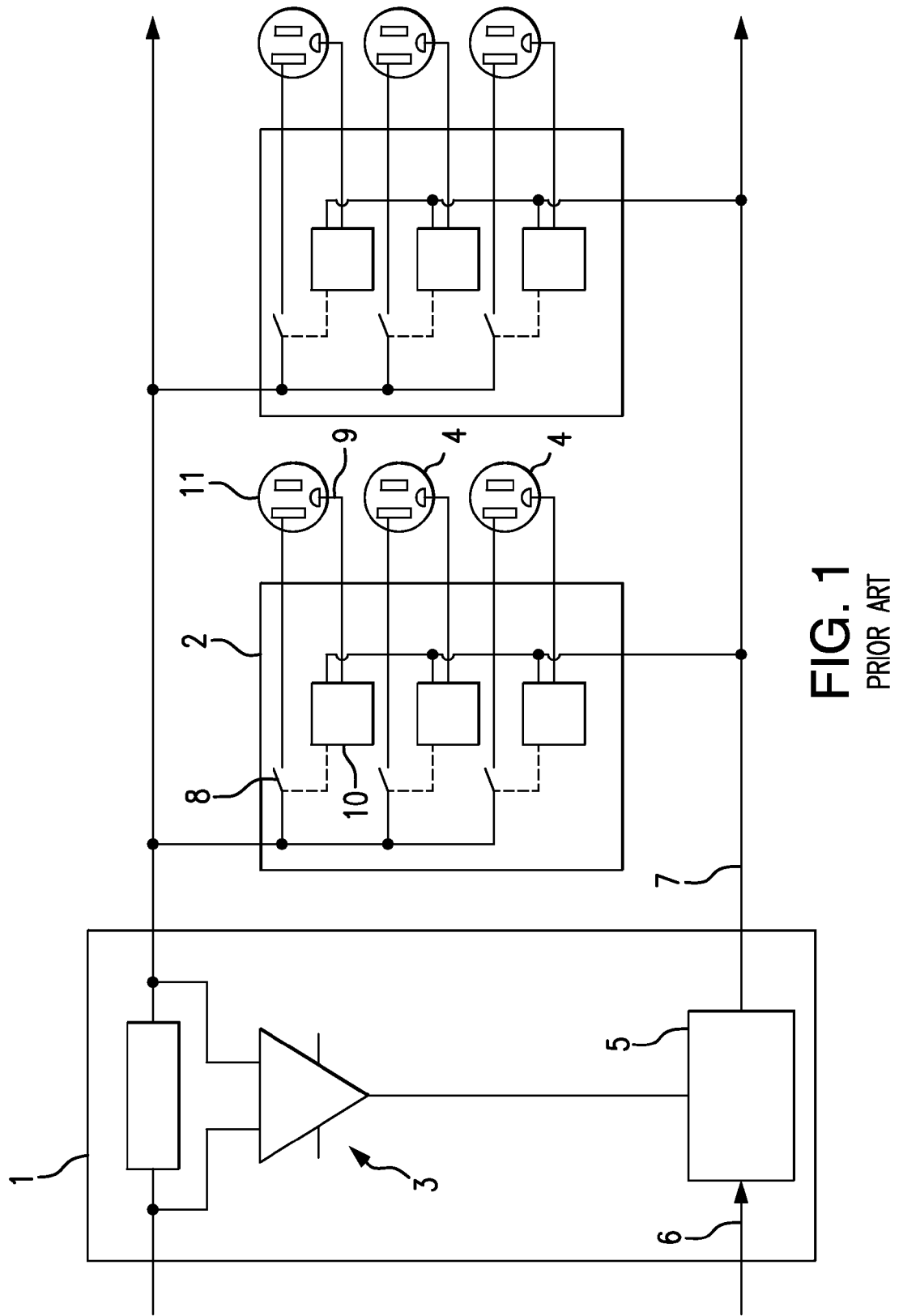
FIG. 1 schematically illustrates a load distribution and management system in accordance with a prior disclosure.
Figure 2:
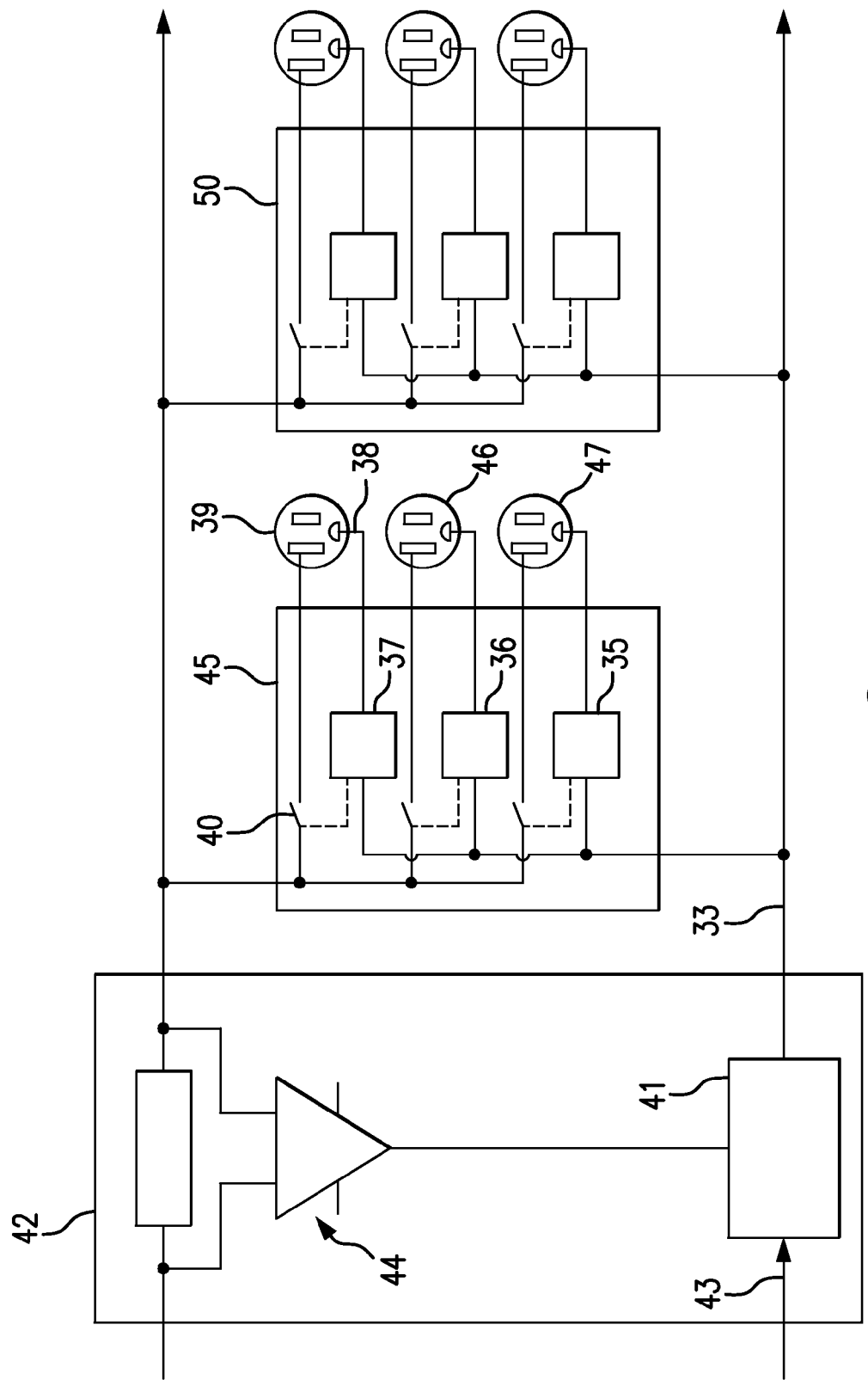
FIG. 2 schematically illustrates a load distribution and management system with power supply units having random timers, in accordance with another prior disclosure.
Figure 3:
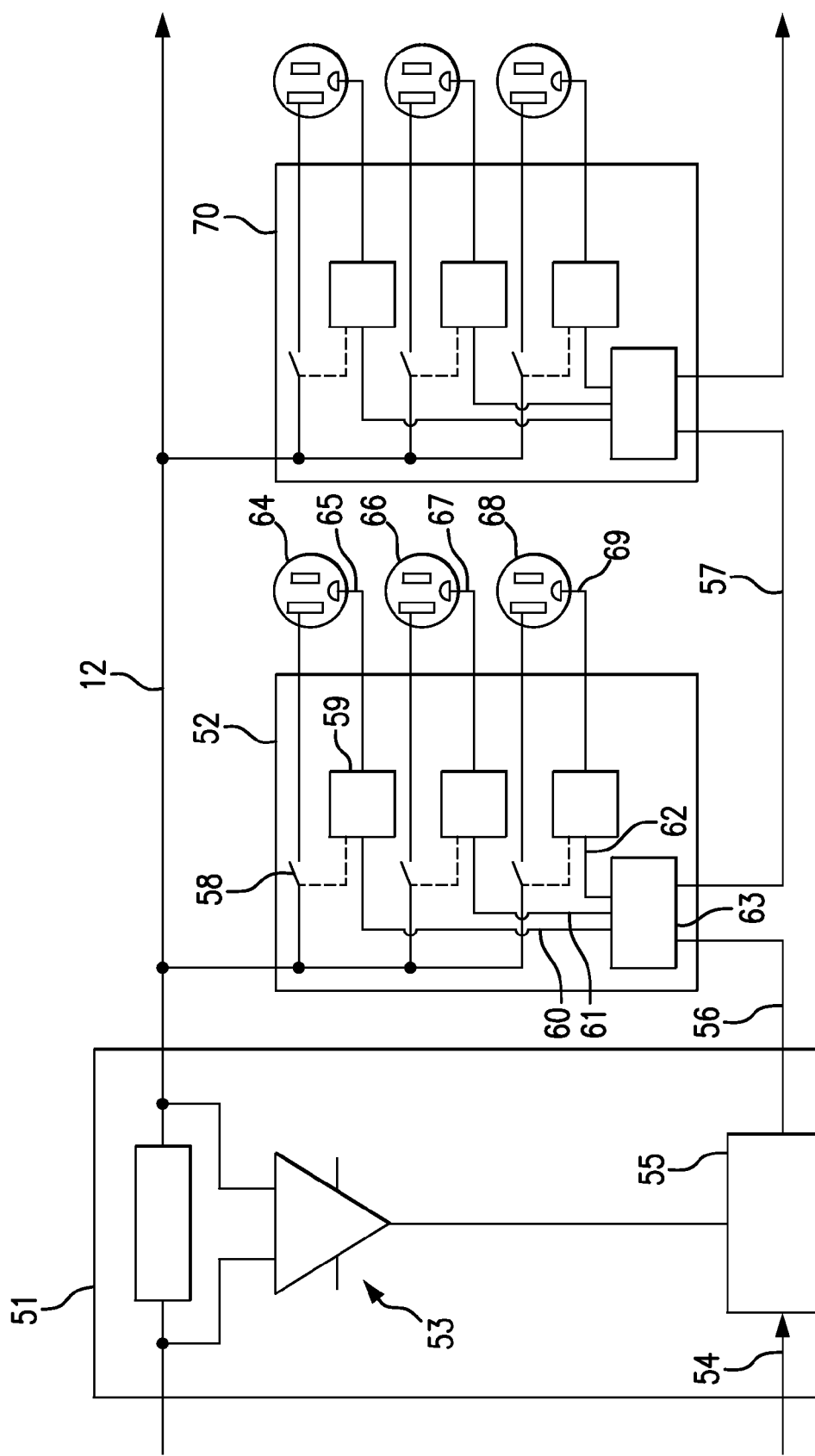
FIG. 3 schematically illustrates an enhanced load management and distribution system in which a signal enabling activation of power outlets is propagated from one power control unit to another, in accordance an embodiment of the present disclosure.

A system according to an embodiment of the disclosure is shown schematically in FIG. 3. Power management circuit 51 includes a limit comparator 55 which has an input corresponding to the power consumed by the system 53 and another input corresponding to the maximum power limit 54. The power management circuit distributes system power to a plurality of power control units 52, 70, etc. via power keyline 12. Each power control unit (e.g. power control unit 52) is connected to several power outlets 64, 66, 68. Each outlet has a power connection to the power control unit, and a line 65, 67, 69 for transmitting a request for power to the power control unit. As shown in FIG. 3, outlet 64 is associated with an enabling circuit 59 which receives a power request 65 and an enabling signal 60, and is connected to an outlet control 58 for controlling delivery of system power to the outlet. Each power control unit has a timing control circuit 63 which sends appropriate enabling signals 60, 61, 62 to the outlets 64, 65, 66 respectively. Timing control circuit 63 is connected to a first ENABLE keyline 56 and a second ENABLE keyline 57. Timing control circuit 63 receives the status of the ENABLE keyline 56 as an input, and outputs an appropriate signal to the next power control unit 70 over the second ENABLE keyline 57.

Figure 4:
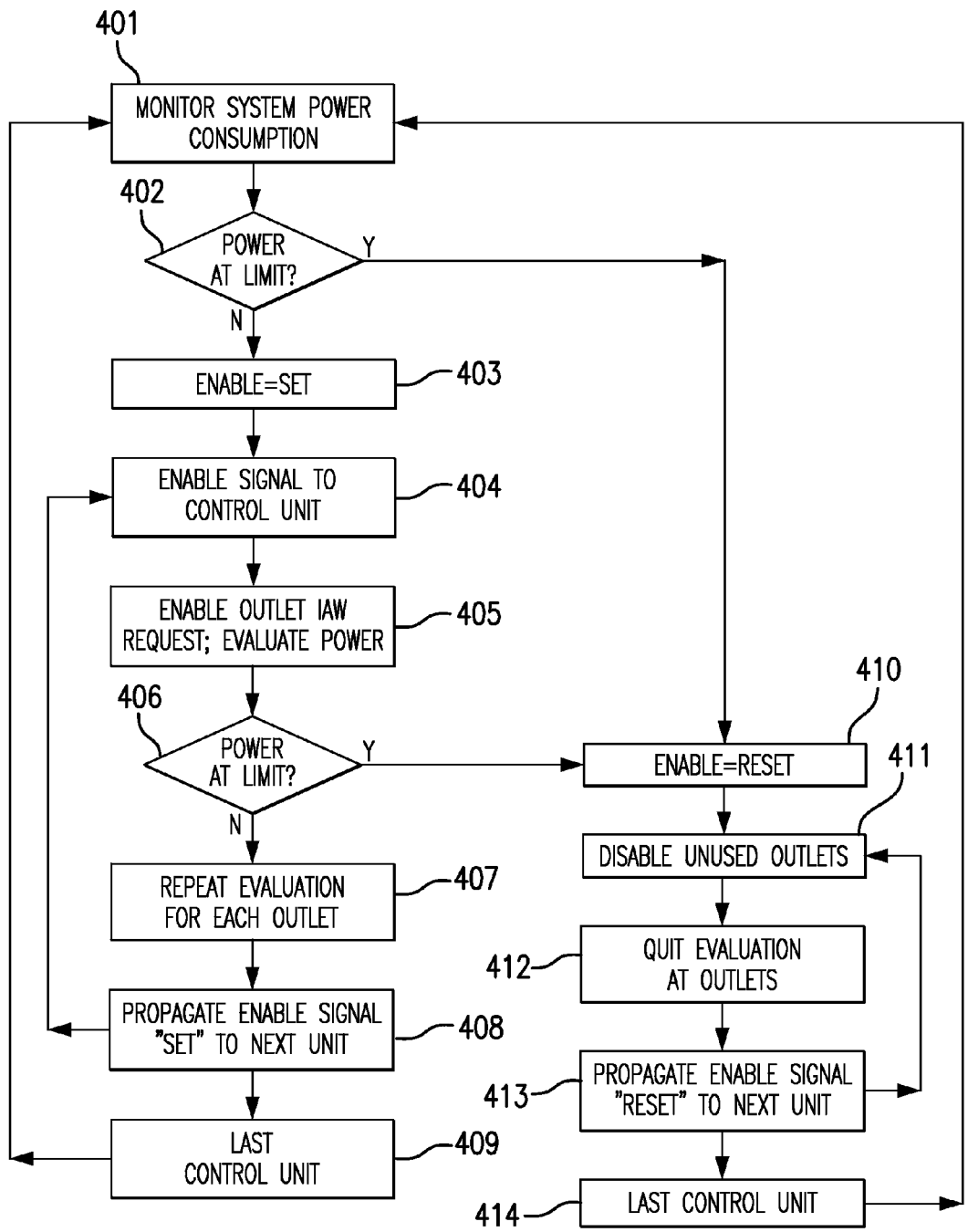
FIG. 4 is a flowchart schematically illustrating operation of an enhanced load management and distribution system in accordance with an embodiment of the disclosure.

An overview of operation of a system embodying the disclosure is shown in FIG. 4. The power management circuit monitors the system power consumption (step 401) and compares that power level to the power limit (step 402). If the power limit has not been reached, the first ENABLE keyline is SET (step 403) and this signal is input to a power control unit (step 404). The power control unit proceeds to evaluate the status of the outlets in that unit. If there is a request for power at an outlet, the outlet is enabled in accordance with that request (step 405) and a time delay begins as described in detail below. During the time delay, the total power consumed continues to be monitored by the limit comparator (step 406). If the power limit has not been reached, the status evaluation is repeated for each outlet of the power control unit sequentially (step 407). The ENABLE keyline signal SET is then propagated to the next power control unit (step 408). These steps are repeated for each power control unit to the last power control unit in the system (step 409).

If the total system power limit is reached (step 406), the ENABLE keyline is reset (step 410). Unused outlets of the power control unit are immediately disabled (step 411) and evaluation of outlets where consumers have plugged in devices is immediately halted (step 412). The RESET signal is propagated immediately through each of the power control units (step 413) to the last power control unit (step 414). The system then operates in the power management mode until the power consumption level is sufficiently reduced to permit a transition to the enabled mode. Details of power management operation and the transition sequence are also discussed in detail below.

System Enablement without user devices plugged in

Figure 5:
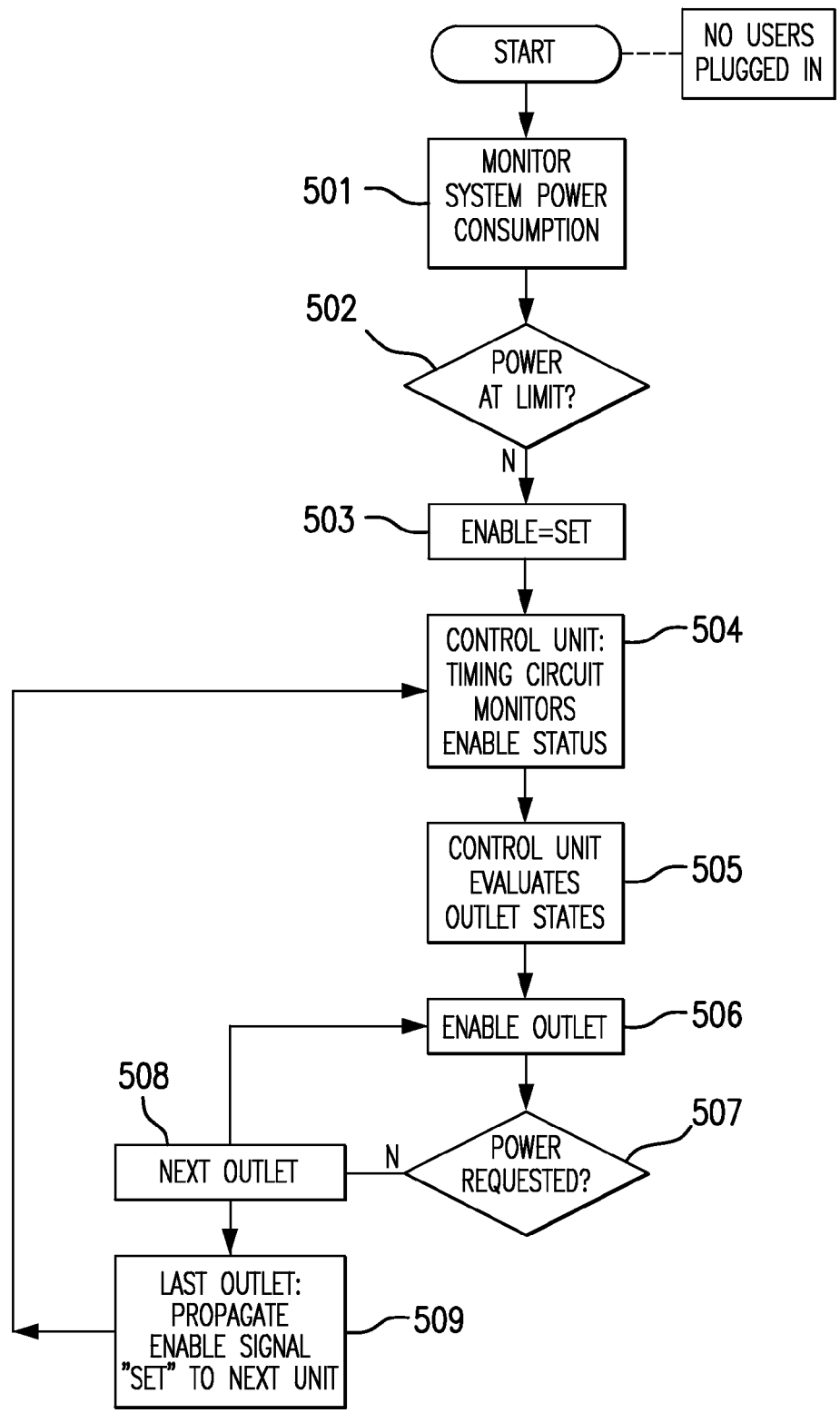

FIG. 5 schematically illustrates the procedure of enablement of the system when no user devices are plugged in, in accordance with an embodiment. Power management circuit 51 monitors the power consumed by the system 53 and compares this power level to the maximum power limit 54, using limit comparator 55 (step 501). When the limit comparator 55 determines that the total power sensed has not reached the limit (step 502), the ENABLE keyline 56 is SET (step 503). This signal is input to power control unit 52, and timing control circuit 63 accordingly initiates evaluation of the outlet states for outlets 64, 66, 68 (step 504). Outlet 64 is enabled by signal 60 (step 506). The power control unit monitors outlet 64 to determine whether power is being requested by a power request signal 65 (step 507); if not, enable signal 61 is activated and the next outlet, outlet 66, is evaluated via power request signal 67 (step 508). This sequence continues until all outlets have been evaluated; the ENABLE signal SET is then propagated on ENABLE keyline 57 (step 509), initiating the same sequence in the next power control unit 70. This procedure continues to the last power control unit in the system.

System Enablement with user devices plugged in

Figure 6:
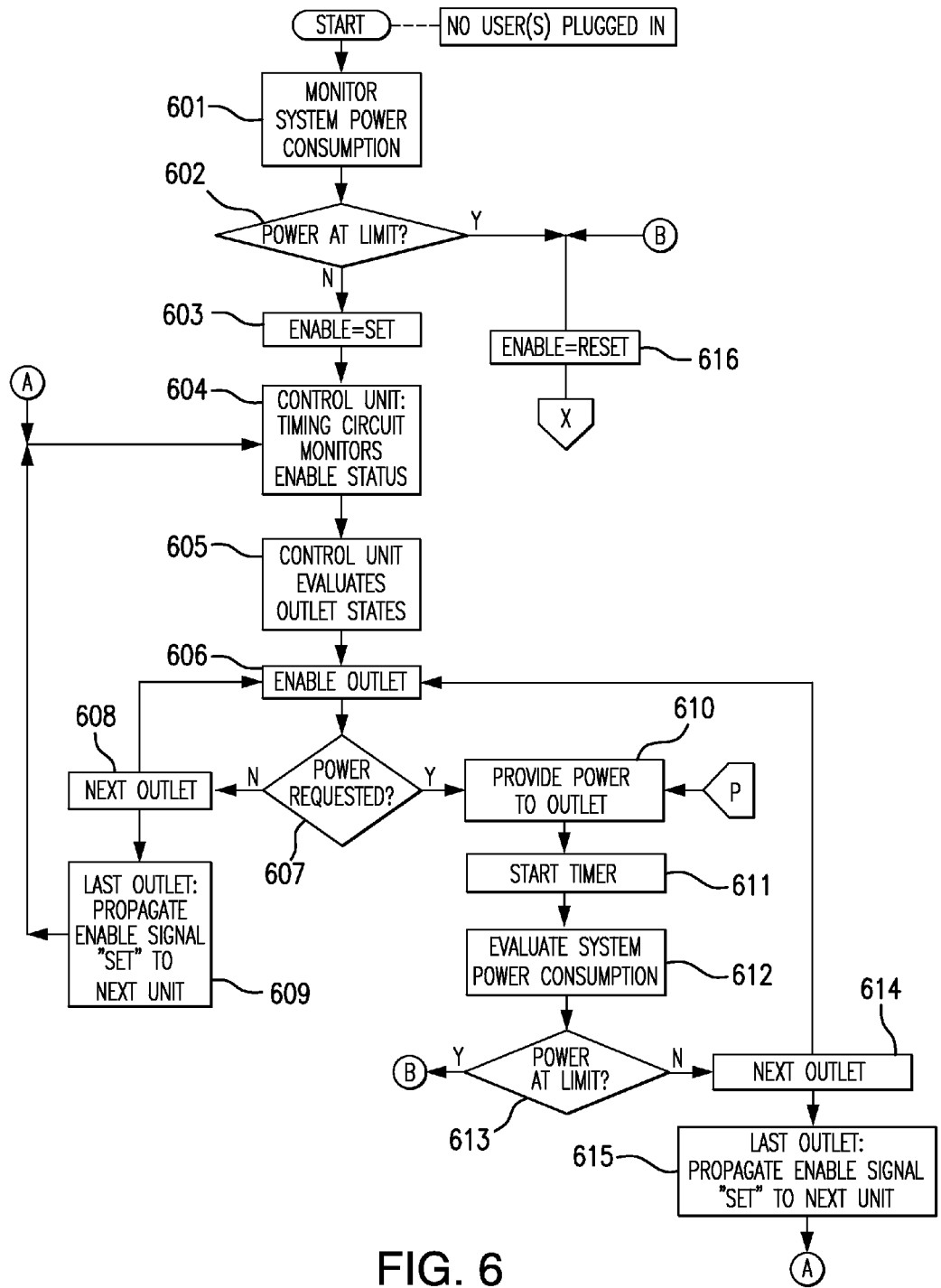
Figure 7A:
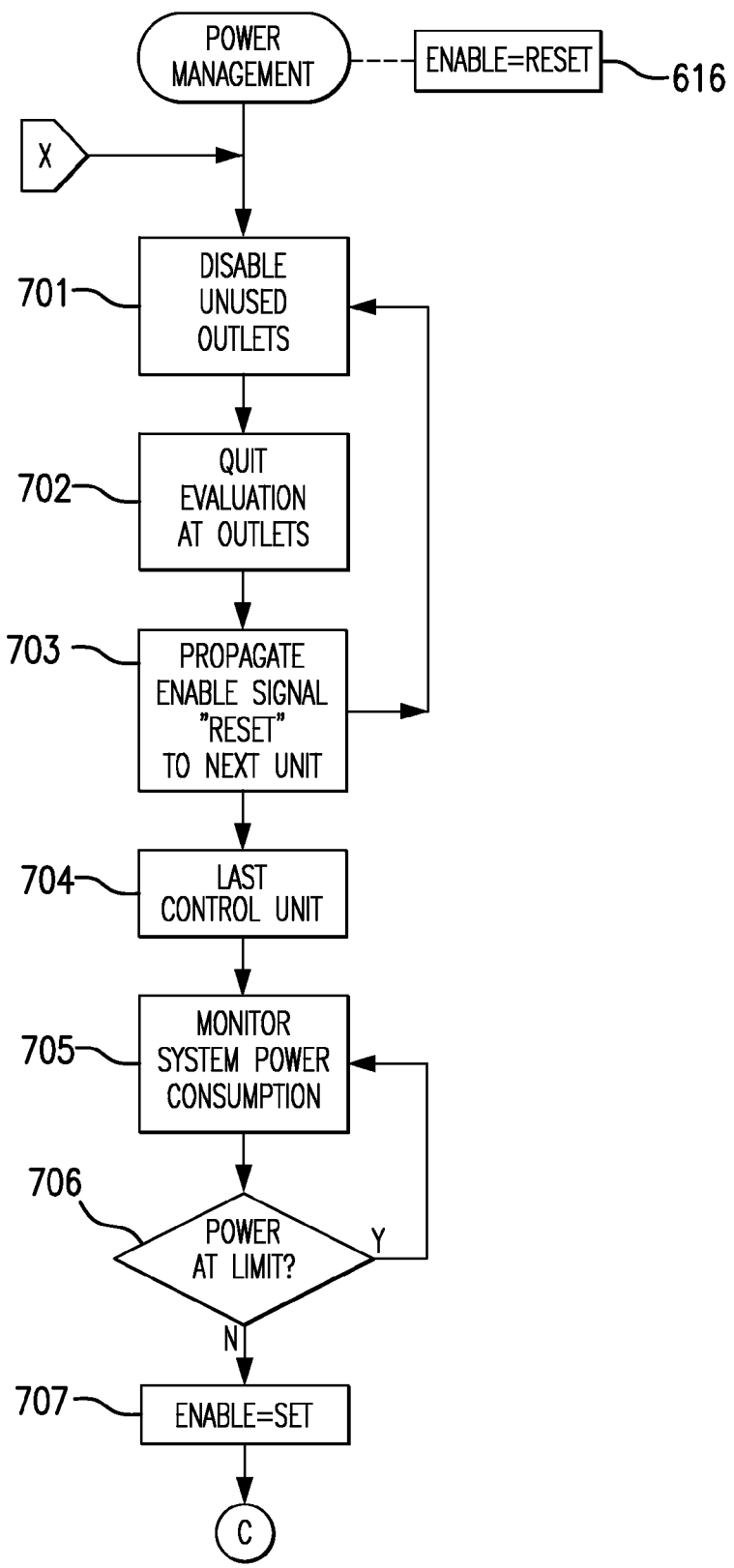
FIGS. 7A and 7B are connected flowcharts schematically illustrating operation of a system according to an embodiment of the disclosure in a power management mode.
Figure 7B:
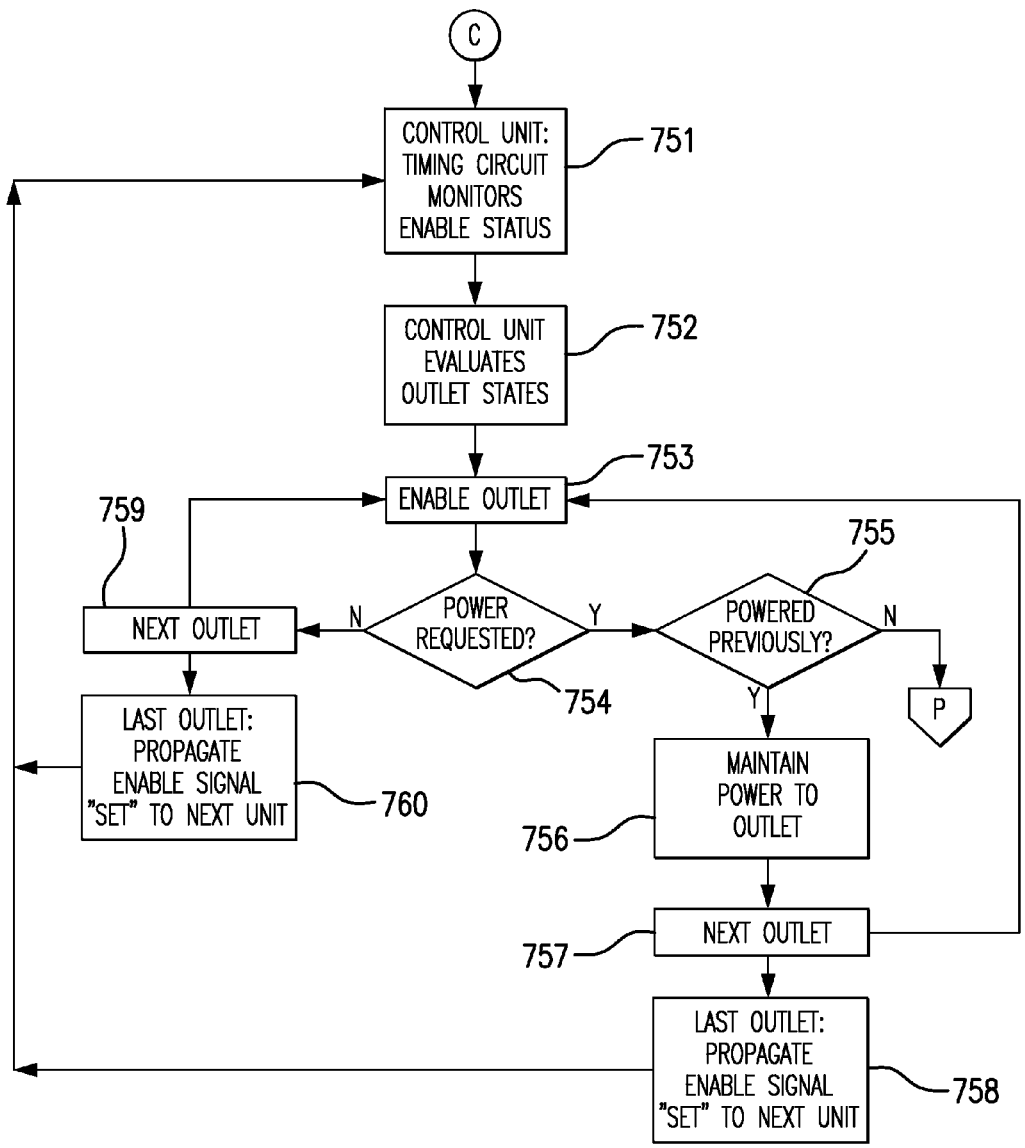
Figure 8:
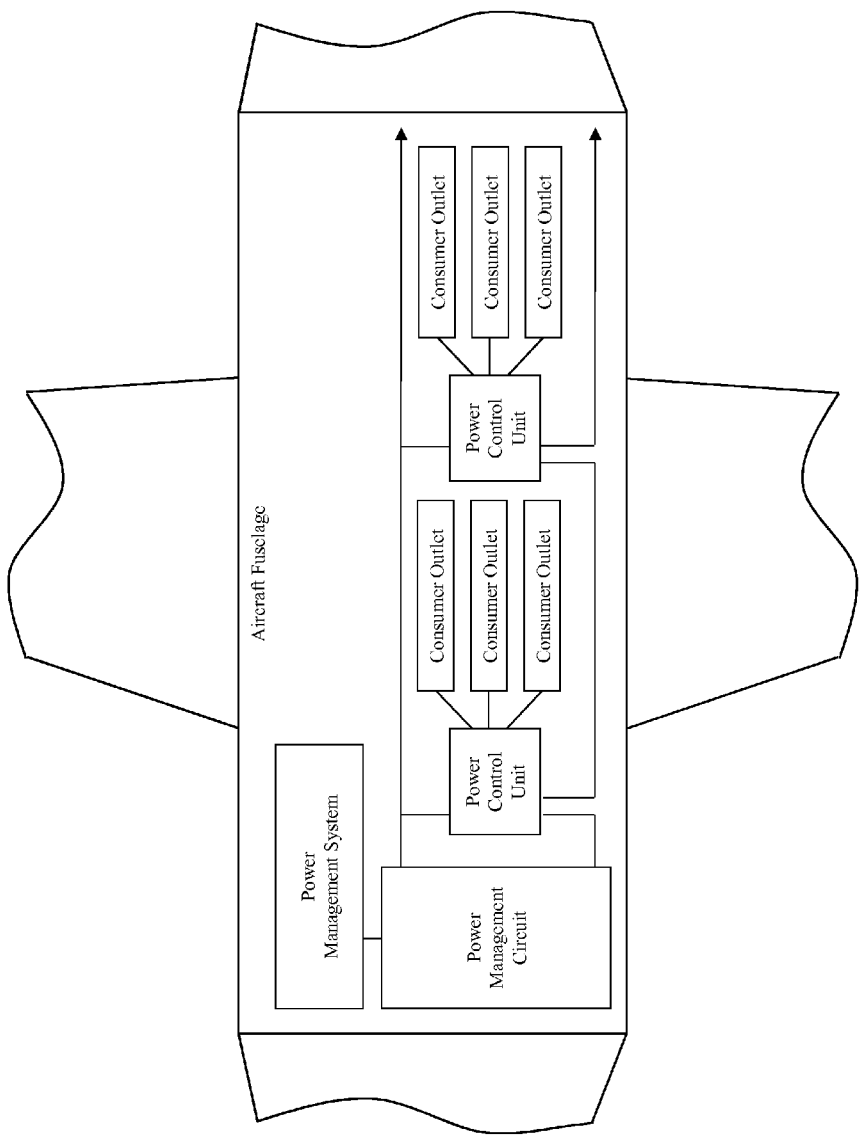
FIG. 8 is a schematic drawing of an embodiment system as incorporated into an aircraft and in which a power management circuit is integrated into an aircraft power management system.

FIG. 6 schematically illustrates the procedure of enablement of the system when at least one user device is plugged in, in accordance with an embodiment. Power management circuit 51 monitors the power consumed by the system 53 and compares this power level to the maximum power limit 54, using limit comparator 55 (step 601). When the limit comparator 55 determines that the total power sense has not reached the limit (step 602), the ENABLE keyline 56 is SET (step 603). This signal is input to power control unit 52, and timing control circuit 63 accordingly initiates evaluation of the outlet states for outlets 64, 66, 68 (step 604). Outlet 64 is enabled by signal 60 (step 606). The power control unit monitors outlet 64 to determine whether power is being requested by a power request signal 65 (step 607); if not, enable signal 61 is activated and the next outlet (in this case outlet 66) is evaluated via power request signal 67 (step 608). If the outlet being evaluated is the last outlet in the power control unit and the ENABLE keyline is still SET, the ENABLE keyline signal is propagated to the next power control unit (step 609).

If power is requested, the request is granted and outlet control 58 causes power to be provided to the outlet (step 610). A timer is then initiated (step 611) delaying evaluation of the next outlet by a predetermined interval. The delay time is long enough (e.g. 10 seconds) to permit the load at the outlet to reach full power and for the power management circuit 51 to evaluate the total power consumed (step 612). The total power consumed continues to be monitored by the limit comparator 55; if the power consumed 53 has not reached the maximum power limit (step 613), the ENABLE keyline 56 remains SET. When the delay time expires, if the ENABLE keyline 56 is still SET, the next outlet will be evaluated (step 614). If a user device is plugged into the next outlet (in this case outlet 66) and a request 67 for power is active, the same sequence is performed by the timing control circuit 63 while the power management circuit 51 evaluates the total power consumed. If a user device is not plugged into an outlet (e.g. the next outlet 68), the timing control circuit evaluates that outlet without a delay. This sequence is repeated for all of the outlets connected to the power control unit. If the outlet being evaluated is the last outlet in the power control unit and the ENABLE keyline is still SET, the ENABLE keyline signal is propagated to the next power control unit (step 615).

This procedure permits evaluation of the loads one at a time, thereby ensuring that the system maximum power load is not exceeded. In particular, the ENABLE keyline signal is propagated from one power control unit to another, as opposed to being transmitted to all power control units at once. This ensures that, during a transition from RESET to SET of the ENABLE keyline, only one outlet is evaluated (with an ample measurement time) and enabled before moving on to evaluate the next outlet.

If the total system power has reached the limit, the ENABLE keyline 56 is reset (step 616). This is propagated immediately through each of the power control units 52, 70, etc. This ensures that when the system has reached the maximum load limit, the unused outlets are disabled and the evaluation of consumer devices is halted. The system then enters power management mode.

Normal Operation

Normal operation is characterized by the ENABLE keyline signal being SET (that is, enable mode). As a consumer connects a device to outlet 64, a request for power 65 is initiated to the power control unit 52. If the ENABLE keyline 56 is SET when the request for power is initiated, outlet control 58 enables power to the outlet and thence to the device. No delays are required, due to the ENABLE keyline being SET prior to the request for power 65.

Power Management Operation

When the total system power as determined by the power management circuit 51 reaches the limit, the ENABLE keyline 56 is reset (step 616). The RESET signal input to a power control unit causes unused outlets to be disabled (step 701) and evaluation of outlets to be halted (step 702). The ENABLE signal RESET is propagated through each of the power control units 52, 70, etc. (step 703) to the last control unit (step 704).

The power management circuit continues to monitor the system power consumption (step 705). As the total power consumed falls below the maximum limit 54, as determined by limit comparator 55 (step 706), the ENABLE keyline 56 is SET (step 707). The SET signal is input to power control unit 52 (step, which starts the evaluation of the outlets 64, 66, 68 connected to the power control unit (step 752). Outlets are enabled and evaluated one by one as described above (step 753). Each outlet is evaluated for the presence of a power request (step 754). If an outlet is not requesting power, the evaluation sequence proceeds to the next outlet (step 759). If an outlet is requesting power that previously had power (that is, the outlet was in use upon entering power management mode) (step 755), power to that outlet is maintained (step 756) and the sequence proceeds to the next outlet (step 757). If the outlet being evaluated is the last outlet in the power control unit and the ENABLE keyline is still SET, the SET signal is propagated to the next power control unit via keyline 57 (steps 758, 760).

For each outlet that is requesting power that did not have power granted prior to the maximum limit being reached, the timing control circuit causes a delay as that outlet is activated (see FIG. 6, steps 610-611). When that time delay expires and if additional power is still available (steps 612-613), the SET signal is propagated to the next power control unit (step 615). This signal will continue to propagate through the system until either the maximum power limit has again been reached, or the end of the chain of power control units is reached while the system power consumed remains below the limit.

Alternate Embodiments

In alternate embodiments, the ENABLE keyline 56, 57, etc. is not a physical connection from one power control unit to another; a communication bus may be provided to enable power control units one at a time. In still other embodiments, the power management circuit 51 may be a standalone unit integrated into a power management system that is part of an aircraft power distribution system, or be configured as another means of controlling a measuring power.

While the disclosure has been described in terms of specific embodiments, it is evident in view of the foregoing description that numerous alternatives, modifications and variations will be apparent to those skilled in the art. Accordingly, the disclosure is intended to encompass all such alternatives, modifications and variations which fall within the scope and spirit of the disclosure and the following claims.

I claim:

1. A system for managing distribution of electrical power, comprising:
    a power management circuit including
        a device configured to measure power consumed by an electrical load, and
        a comparator configured to compare the measured power with a power limit;
    a plurality of power control units each including
        a plurality of outlets for delivering power to a load,
        a timing control circuit coupled to each said outlet, the timing control circuit configured to deliver an enabling signal to each outlet individually with a time delay,
        a signal input, and
        a signal output;
    a first keyline connecting the power management circuit with the signal input of one of said plurality of power control units; and
    a second keyline connecting the signal output of said one of said plurality of power control units with the signal input of another one of said plurality of power control units,
    wherein each power control unit is configured to propagate a signal to another power control unit via the second keyline;
    wherein each power control unit is configured to, when receiving a SET signal, evaluate whether an outlet associated with it is requesting power, and if so, start a time delay using the timing control circuit and after the expiration of the time delay, determine whether the SET signal remains, and if so, sequentially evaluate the other outlets associated with the power control unit while the SET signal is being received.

2. The system according to claim 1, wherein each power control unit further comprises a power input coupled to a power keyline connected to the power management circuit.

3. The system according to claim 2, wherein each power control unit further comprises an outlet control device coupled to each said outlet and to the power keyline, for delivering power to the outlet in accordance with the outlet being enabled.

4. The system according to claim 1, wherein
the first keyline is characterized as a first ENABLE keyline for delivering one of the SET signal and a RESET signal,
the second keyline is characterized as a second ENABLE keyline over which one of the SET signal and the RESET signal, in accordance with the signal from the first ENABLE keyline, is propagated to another power control unit.

5. The system according to claim 4, wherein a comparison indicating the measured power exceeding the power limit causes a reset condition in which the RESET signal is delivered to the first keyline.

6. The system according to claim 5, wherein in said reset condition, outlets without a consumer device connected thereto at initiation of the reset condition are prevented from being enabled.

7. The system according to claim 1, wherein each outlet is configured to deliver a signal indicating a request for power in accordance with a consumer device being connected to the outlet.

8. The system according to claim 3, wherein said power management circuit is a standalone unit.

9. The system according to claim 3, wherein said power management circuit is integrated into an aircraft power management system.

10. The system according to claim 9, wherein said outlets are consumer electrical outlets on an aircraft.

* * * * *